United States Patent Office 3,000,975
Patented Sept. 19, 1961

3,000,975
CHLORINATION OF TOLUENE
Eugene P. Di Bella, Garfield, N.J., assignor to Heyden Newport Chemical Corporation, New York, N.Y., a corporation of Delaware
No Drawing. Filed June 4, 1959, Ser. No. 817,991
14 Claims. (Cl. 260—650)

The present invention relates to an improved method for the production of chlorotoluenes. More particularly it relates to an improved method for the production of monochlorination products of toluene whereby there is obtained a mixture of monochlorotoluene isomers of unusually high ortho-chlorotoluene content and unusually low para-chlorotoluene content. Metachlorotoluene is either not formed or is formed in only trace amounts. It further relates to an improved method for the production of polychlorotoluenes and particularly for the production of mixtures of trichlorotoluenes which contain a large amount of the 2,3,6-isomer.

It has been found that when toluene is reacted with chlorine in the presence of certain metallic chloride catalysts the monochlorotoluene mixture formed has an ortho-chlorotoluene content that is substantially higher than that obtained when toluene is chlorinated in the presence of a previously known ring chlorination catalyst, such as iron. The principal product of the dichlorination of toluene in the presence of these novel metallic chloride catalysts is 2,5-dichlorotoluene. When the chlorination of toluene in the presence of a suitable metallic chloride catalyst is continued to the trichloro stage, the resulting mixture of trichlorotoluenes contains a major amount of the 2,3,6-isomer. Further chlorination yields tetrachlorotoluene containing a major amount of the 2,3,5,6-isomer and finally pentachlorotoluene.

The metallic chloride catalysts that will give this desirable distribution of chlorotoluene isomers are all of the chlorides of the metals: titanium, thallium, tin, zirconium, and tungsten. Illustrative of these compounds, which may be added as such or formed in situ, are titanium tetrachloride, titanium dichloride, thallous chloride, thallium sesquichloride, thallium trichloride, stannic chloride, stannous chloride, zirconium tetrachloride, zirconium trichloride, tungsten hexachloride, tungsten tetrachloride, and tungsten dichloride. A single metallic chloride or a mixture of two or more of these chlorides may be used as the catalyst for the chlorination of toluene. The amount of metallic chloride used in the chlorination is in the range of about 0.25 gram to about 5 grams per mole of toluene, with about 1 gram to about 3 grams the preferred amount. Larger amounts of catalyst do no harm.

The chlorination of toluene may be carried out by procedures well known in the art. For example, chlorine may be added to a mixture of toluene and catalyst, and the addition of chlorine continued until there is an increase in the weight of the reaction mixture which indicates that the desired amount of chlorine has reacted with the toluene.

The reaction may be carried out at a temperature in the range of about $-5°$ C. to about $60°$ C. The preferred reaction temperature is about $10°$ C. to about $30°$ C. Below about $-5°$ C., the reaction takes place too slowly to be of commercial interest. At temperatures above about $60°$ C., there is a tendency for side-chain chlorination reaction by-products to form. Since the chlorination is an exothermic reaction, external cooling may be required to maintain the reaction temperature in the desired range.

The rate at which chlorine is added to the reaction mixture does not have an appreciable effect on the yield of chlorotoluene or upon the isomer distribution of the product.

To obtain chlorotoluene mixtures having the improved isomer distribution which results from the practice of the present invention, it is necessary that the chlorination be carried out in the absence of iron. This can be accomplished by using equipment that is glass-lined or that has been fabricated from materials which do not contain iron.

When toluene is monochlorinated in accordance with the present invention the reaction product contains at least 92% of monochlorotoluene and small amounts of toluene and dichlorotoluene. The monochlorotoluene fraction, which contains at least 70% of the ortho-isomer, may be separated from the toluene and dichlorotoluene by well-known procedures. For example, fractional distillation techniques may be used. Similarly, the components of the monochlorotoluene fraction may be separated by fractional distillation.

When the chlorination of toluene in accordance with the present invention is carried beyond the monochloro stage, polychlorotoluene mixtures are obtained which are made up principally of compounds having chlorine atoms in the 2- and 5-positions of the benzene ring. Obviously the amount of such isomers in the reaction mixture is directly dependent upon the ortho-isomer content of the monochlorotoluene mixture, since the chlorination of para-chlorotoluene will yield polychlorotoluenes containing a chlorine atom in the 4-position of the benzene ring. To obtain a maximum yield of the preferred polychlorotoluene isomers one may fractionally distill the mixture of monochlorotoluenes to obtain a fraction which is substantially pure ortho-chlorotoluene and thereafter chlorinate this fraction in the presence of, for example, zirconium tetrachloride. This procedure yields mixtures of trichlorotoluenes whose principal component is 2,3,6-trichlorotoluene and mixtures of tetrachlorotoluenes which contain sizeable amounts of the 2,3,5,6-isomer.

When the chlorination of toluene in accordance with the procedure of this invention is carried to the trichloro stage, the mixture of trichlorotoluenes contains at least 50% of the 2,3,6-isomer. The 2,3,6-isomer may if desired be separated from the mixture of trichlorotoluene isomers. 2,3,6-trichlorotoluene or mixtures of trichlorotoluenes containing at least 50% of the 2,3,6-isomer may be used as an intermediate in the preparation of 2,3,6-trichlorobenzoic acid, which is an effective herbicide.

The preferred catalysts for the preparation of trichlorotoluene, tetrachlorotoluene, and pentachlorotoluene are the chlorides of zirconium, thallium, or mixtures thereof.

The polychlorotoluenes may be prepared by contacting toluene with chlorine in the presence of zirconium chloride or thallium chloride until about 2 to about 5 gram atoms of chlorine has reacted with each mole of toluene. Alternatively, toluene may be monochlorinated in the presence of one of the aforementioned metallic chloride catalysts, a catalytic amount of a zirconium chloride or thallium chloride added, and the chlorination continued to the polychloro stage. If desired, the monochlorinated toluene may be fractionally distilled to remove unreacted toluene and the catalyst before the zirconium chloride or thallium chloride is added and the chlorination continued.

The following examples will illustrate the manner in which the present invention may be practiced. It is to be understood, however, that these examples are not to be construed as being limitative but are furnished merely for purposes of illustration.

*Example 1*

A mixture of 368 grams (4.0 moles) of toluene and 4 grams of titanium tetrachloride was chlorinated by passing a stream of gaseous chlorine over its surface at the rate of about 75 grams per hour. During the chlorination, the reaction mixture was stirred, and external cooling was used to hold the temperature of the reaction mixture in the range of 15°–20° C. The chlorination was continued for about 4 hours after which time the reaction mixture weighed 512 grams. The increase in the weight of the reaction mixture indicated that an average of 1.0 gram atom of chlorine had reacted with each mole of toluene.

Gas chromatographic analysis showed that the reaction mixture had the following composition:

| | Percent |
|---|---|
| Toluene | 0.3 |
| o-Chlorotoluene | 75.1 |
| p-Chlorotoluene | 23.1 |
| Dichlorotoluene | 1.5 |

The monochlorotoluene fraction, which made up 98.2% of the reaction mixture, therefore contained 76.5% of ortho-chlorotoluene and 23.5% of para-chlorotoluene.

*Example 2*

The process was carried out as described in Example 1 except that 12 grams of stannic chloride was used to catalyze the chlorination. The yield of monochlorotoluene was 97.9% based on the amount of toluene charged. This material contained 76.5% of ortho-chlorotoluene.

*Example 3*

The process was carried out as described in Example 1 except that 4 grams of thallous chloride was used to catalyze the reaction. In this case there was obtained a 95% yield of monochlorotoluene which contained 70% of the ortho-isomer.

*Example 4*

The process was carried out as described in Example 1 except that 4 grams of zirconium tetrachloride was used to catalyze the reaction. A 92.8% yield was obtained of monochlorotoluene which contained 71.8% of ortho-chlorotoluene.

*Example 5*

The process was carried out as described in Example 1 except that 4 grams of tungsten hexachloride was used to catalyze the reaction. The reaction mixture contained 98.5% of monochlorotoluene, 1.0% of toluene, and 0.5% of dichlorotoluene. The monochlorotoluene fraction contained 75% of ortho-chlorotoluene and 25% of para-chlorotoluene.

*Example 6*

For comparative purposes the chlorination of toluene as described in Example 1 was repeated using as catalyst 4.4 grams of iron powder. When the chlorination had been completed, the reaction mixture contained 96.8% of monochlorotoluene. The ortho-chlorotoluene content of the monochlorotoluene was 61.5%.

*Example 7*

A mixture of 368 grams (4.0 moles) of toluene and 4 grams of zirconium tetrachloride was chlorinated by passing a stream of chlorine over its surface until 12.24 gram atoms of chlorine had reacted with it. During the chlorination the reaction mixture was stirred, and external cooling was applied as necessary to hold the temperature of the reaction mixture in the range of 15°–25° C. An 88% yield was obtained of a trichlorotoluene mixture which contained 51.1% of 2,3,6-trichlorotoluene. The yield of the 2,3,6-isomer by this procedure was therefore 45.0% based on the amount of toluene charged.

*Example 8*

In a comparative experiment, the chlorination described in Example 7 was repeated using iron powder as the chlorination catalyst. In this experient there was obtained an 82.1% yield of a mixture of trichlorotoluenes which contained 42.3% of the 2,3,6-isomer. The yield of 2,3,6-trichlorotoluene in this case was 34.7% based on the amount of toluene charged.

I claim:
1. A process for the production of a mixture of ortho- and para-chlorotoluenes containing at least 70% of ortho-chlorotoluene which comprises contacting toluene with chlorine in the amount of about 1 gram atom of chlorine per mole of toluene in the presence of a catalyst selected from the group consisting of the chlorides of titanium, thallium, tin, zirconium, tungsten, and mixtures thereof.

2. A process as defined in claim 1 wherein the catalyst is titanium tetrachloride.

3. A process as defined in claim 1 wherein the catalyst is thallous chloride.

4. A process as defined in claim 1 wherein the catalyst is stannic chloride.

5. A process as defined in claim 1 wherein the catalyst is zirconium tetrachloride.

6. A process as defined in claim 1 wherein the catalyst is tungsten hexachloride.

7. A process for the preparation of ortho-chlorotoluene which comprises the steps of contacting toluene with chlorine in the amount of about 1 gram atom of chlorine per mole of toluene in the presence of a catalyst selected from the group consisting of the chlorides of titanium, thallium, tin, zirconium, tungsten, and mixtures thereof to form a mixture of chlorotoluenes containing at least 70% of ortho-chlorotoluene and thereafter separating ortho-chlorotoluene by fractional distillation from said mixture of chlorotoluenes.

8. A process for the preparation of dichlorotoluenes containing a major amount of 2,5-dichlorotoluene which comprises contacting toluene with chlorine in the amount of about 2 gram atoms of chlorine per mole of toluene in the presence of a catalyst selected from the group consisting of the chlorides of titanium, thallium, tin, zirconium, tungsten, and mixtures thereof.

9. A process for the preparation of a mixture of trichlorotoluenes containing at least 50% of 2,3,6-trichlorotoluene which comprises contacting toluene with chlorine in the amount of about 3 gram atoms of chlorine per mole of toluene in the presence of a zirconium chloride catalyst.

10. A process as defined in claim 9 wherein the catalyst is zirconium tetrachloride.

11. A process for the preparation of a mixture of trichlorotoluenes containing at least 50% of 2,3,6-trichlorotoluene which comprises contacting toluene with chlorine in the amount of about 3 gram atoms of chlorine per mole of toluene in the presence of a thallium chloride catalyst.

12. A process for the preparation of a mixture of trichlorotoluenes containing at least 50% of 2,3,6-trichlorotoluene which comprises the steps of contacting toluene with chlorine in the amount of about 1 to 2 gram atoms of chlorine per mole of toluene in the presence of a catalyst selected from the group consisting of the chlorides of titanium, thallium, tin, zirconium, tungsten, and mixtures thereof to form a mixture of chlorotoluenes and thereafter contacting said mixture of chlorotoluenes with chlorine in the presence of a zirconium chloride catalyst to form a mixture of trichlorotoluenes containing at least 50% of 2,3,6-trichlorotoluene.

13. A process for the preparation of a mixture of trichlorotoluenes containing a major amount of the 2,3,6-isomer which comprises contacting ortho-chlorotoluene with chlorine in the amount of about 2 gram atoms of chlorine per mole of ortho-chlorotoluene in the presence of a zirconium chloride catalyst.

14. A process for the preparation of polychlorotoluenes containing from 2 to 5 chlorine atoms in the benzene ring and containing a major amount of polychlorotoluene having a chlorine substituent in at least one of the ortho positions of the aromatic nucleus comprising contacting toluene with chlorine in the amount of about 2 to about 5 gram atoms of chlorine per mole of toluene in the presence of a zirconium chloride catalyst.

References Cited in the file of this patent

UNITED STATES PATENTS 2,805,264    Kissling _____ Sept. 3, 1957

FOREIGN PATENTS 108,424    Austria _____ Dec. 27, 1927